(12) United States Patent
Flack et al.

(10) Patent No.: US 8,991,213 B1
(45) Date of Patent: Mar. 31, 2015

(54) METHOD FOR PRODUCING CELLULAR GLASS FROM WASTE GLASS STREAMS

(71) Applicant: Blome International, Inc., O'Fallon, MO (US)

(72) Inventors: Victor Flack, Ballwin, MO (US); Andrew Bernard, St. Louis, MO (US); Steven Blome, St. Charles, MO (US)

(73) Assignee: Biome International, Inc., O'Fallon, MO (US)

( * ) Notice: Subject to any disclaimer, the term of this patent is extended or adjusted under 35 U.S.C. 154(b) by 119 days.

(21) Appl. No.: 13/630,611

(22) Filed: Sep. 28, 2012

Related U.S. Application Data

(63) Continuation-in-part of application No. 13/189,123, filed on Jul. 22, 2011, now abandoned.

(60) Provisional application No. 61/366,610, filed on Jul. 22, 2010.

(51) Int. Cl.
    *C03B 19/08* (2006.01)
    *C03C 11/00* (2006.01)

(52) U.S. Cl.
    CPC ............... *C03B 19/08* (2013.01); *C03C 11/007* (2013.01)
    USPC .......................................................... 65/22

(58) Field of Classification Search
    CPC ........ C03B 19/08; C03C 11/00; C03C 11/007
    USPC .......................................................... 65/22
    See application file for complete search history.

(56) References Cited

U.S. PATENT DOCUMENTS

| | | | |
|---|---|---|---|
| 1,304,623 A * | 5/1919 | Sullivan et al. | 501/66 |
| 2,123,536 A | 7/1938 | Long | |
| 2,611,712 A | 9/1952 | Ford | |
| 2,955,049 A | 10/1960 | Booth | |
| 3,354,024 A | 11/1967 | D'Eustachio et al. | |
| 3,592,619 A | 7/1971 | Elmer et al. | |
| 3,945,816 A | 3/1976 | Johnson | |
| 4,104,074 A | 8/1978 | Rostoker | |
| 4,192,664 A | 3/1980 | Joshi | |
| 4,703,019 A * | 10/1987 | Abe et al. | 501/13 |
| 6,964,809 B2 | 11/2005 | Hofaji et al. | |
| 7,459,208 B2 | 12/2008 | Wang | |
| 2002/0038919 A1* | 4/2002 | Gontmakher et al. | 264/42 |
| 2008/0096018 A1* | 4/2008 | Zhang et al. | 428/402 |
| 2008/0286555 A1* | 11/2008 | Huston et al. | 428/314.8 |

* cited by examiner

*Primary Examiner* — Cynthia Szewczyk
(74) *Attorney, Agent, or Firm* — Spencer Fane Britt & Brown LLP

(57) ABSTRACT

A method by which recovered glass from waste steams can be used to create a closed cell foam glass in the 9 to 13 lbs/ft$^3$ density range using a single-step foaming process. The waste glass is mixed with foaming agents and the boron content is adjusted and maintained between 7 to 14% of the mixture. The mixture is formed into a charge and fired at a temperatures ranging from 100° C. to 250° C. above the softening point of the waste glass for a controlled period of time. The waste glass can be obtained from commercial waste streams of high borosilicate glass to common container glass from recycling sources. The glass is ground to an appropriate size and mixed with fluxes, enhancers, and foaming agents which are then properly dispersed within the mixture. The mixture batch can be adjusted with respect to the additives, firing temperature and schedule to produce the desired closed-cell end product which is water insoluble, acid resistant and has a low coefficient of expansion within the range of $33 \times 10^{-7}$ to $55 \times 10^{-7}$.

20 Claims, 3 Drawing Sheets

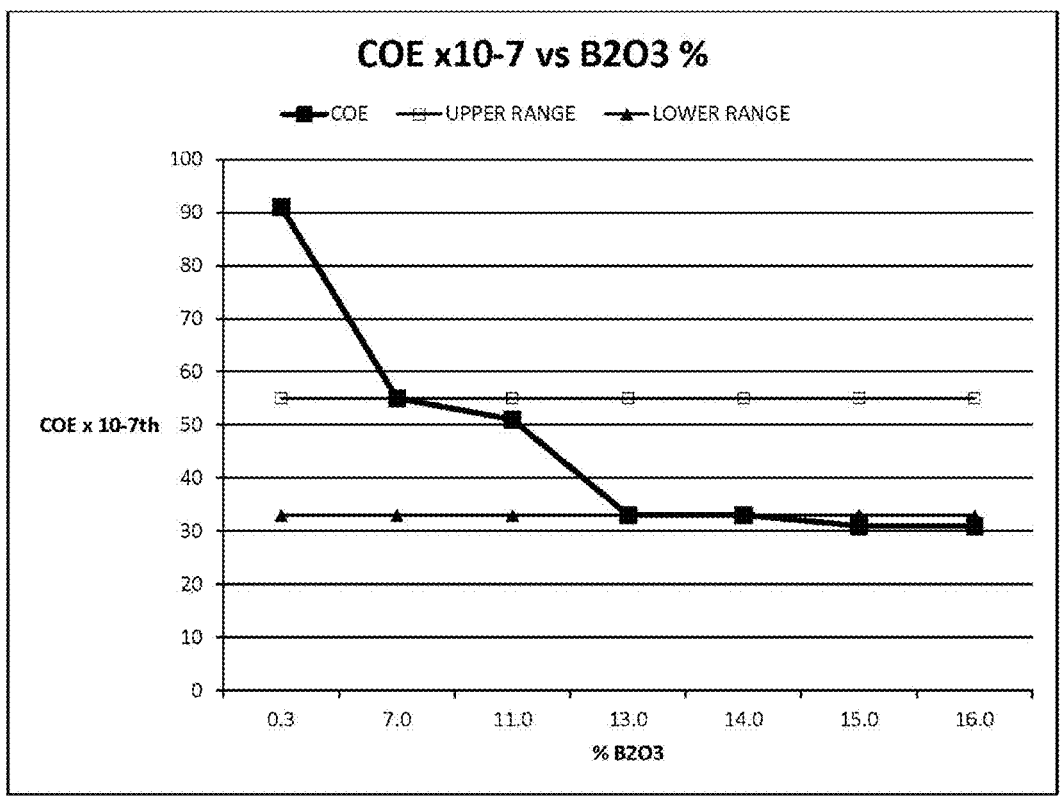

METHOD FOR PRODUCING CELLULAR GLASS FROM WASTE GLASS STREAMS

RELATED APPLICATIONS

The present non-provisional patent application is a continuation-in-part of application Ser. No. 13/189,123, filed Jul. 22, 2011, which claims priority benefit of an earlier-filed provisional patent application entitled Producing Cellular Glass From Waste Streams, Ser. No. 61/366,610, filed Jul. 22, 2010. The identified earlier-filed applications are hereby incorporated by reference into the present application.

FIELD OF THE INVENTION

The present invention relates to cellular foam glass blocks. More specifically, the present invention relates to a method for producing borosilicate cellular foam glass blocks for use in flue gas environments.

BACKGROUND OF THE INVENTION

Cellular foam glass is used for heat insulation, with properties of light weight, low thermal conductivity, non-moisture absorbing, and resistance to chemical corrosive materials. Cellular foam glass is frequently used in harsh conditions with moist and corrosive environments such as is present in flue gas stacks. A typical such environment exposes cellular foam glass to flue gas and undergoes wet and dry cycling, acid and other chemical exposure, and temperature variances up to 500° F. and higher. Blocks in the flue gas environment are exposed to water and the pH variation to which they are exposed can range between 1 to 9 depending on where the blocks are located in the flue gas stream. Cellular foam glass used in these environments must be resistant to such harsh exposure. Foam glass having a closed cell structure is required for a wet and dry cycling environment so that moisture stays out of the interior of the foam glass block. Otherwise, moisture that penetrates into the foam glass will expand and contract under a considerably higher coefficient of expansion than that for the cell walls inside the block, and can cause the foam glass cell walls to crack, thus damaging the foam glass block.

The harsh conditions placed upon cellular glass blocks are especially pronounced in flue gas stacks having a substantial height, often up to 300 feet in length. Blocks are normally applied in continuous contact with each other along the length of the flue gas stack. As blocks in the flue gas stack heat up, the expansion of the blocks along the length of the flue gas stack require that their coefficient of expansion be low enough to prevent crushing the blocks or to cause other failure. As such, blocks used in the flue gas environment, especially in flue gas stacks, should have properties comprising a closed cell foam having high water insolubility, excellent acid resistance, and a low coefficient of expansion, and provide sufficient strength to withstand the abrasion of particles from the high velocity flue gas exposure.

There exist known methods for producing foamed glass (cellular glass) using controlled raw materials to insure that the chemical composition of the charged mixture is pure and very consistent. The constituent materials are mixed to insure completely uniform contact of all basic chemicals with each other. In some cases, an aqueous solution of the mixed materials is blended with silica to make a slurry. The slurry is then spray dried to obtain a completely uniform mixture for foaming. Alternatively, the ingredients are melted to form a homogeneous liquid glass mixture prior to foaming. In many cases, a two-step foaming process is utilized wherein the product is foamed and then re-ground with a new charge prior to making the final foamed glass. All of the present processes, although differing in minor points from one to another, are tedious and increase the cost of the final product. The processes all start with a very consistent mixture of glass chemicals that are pure and uniform. The double firing process is costly and time consuming while using double the amount of energy to produce the product.

Other prior art processes are designed to produce a pure silica foam, and add excess boron, up to 50% by weight, to achieve lower softening temperatures for ease of foaming and then leach out the boron with hot water to produce a nearly pure silica foam. This process produces an open cell foam which is friable and weak. Blocks produced by this process, while useful for insulation against high temperatures when used in a less harsh environment, are therefore unsuitable in the harsh environment of high velocity flue gas streams undergoing cycling temperatures and wet and dry exposures. The harsh environment of the flue gas stack requires a closed-cell block. Other processes contemplate a boron content but provide no detail by which to control the boron content or achieve an appropriate coefficient of expansion suitable for the flue gas environment. As with the other processes, a higher content of boron may lead to phase separation whereby the product is water soluble and a closed cell structure is not created. Additionally, without controlling the boron content to within proper ranges, the coefficient of expansion of the produced block is subject to substantial variation. And so, foam glass blocks produced under these processes are not well-suited for the wet and dry cycling and wide range temperature environment in flue gas applications.

SUMMARY OF THE INVENTION

The present invention relates to a method for producing cellular foam glass blocks having properties that allow the blocks to be used in critical applications such as in a flue gas environment. In a flue gas environment, the gas temperature varies from 100° F. to 500° F. and higher. Blocks in this environment are exposed to condensed water with the pH variation from 1 to 9 depending on where the blocks are located in the flue gas stream. The blocks are generally applied in continuous contact with each other for up to 300 feet in length over the height of the flue gas stack. As the blocks heat up in the operation the expansion of the blocks over the length of the flue gas stack in one direction require that the coefficient of expansion be low enough to prevent crushing the blocks or other failure. Foam glass blocks in this environment require certain physical properties, such as comprising a closed cell structure having high water insolubility, acid resistance and a low coefficient of expansion with sufficient strength to withstand the abrasion of particles in a high velocity flue gas exposure. This invention produces a foam glass that is designed to act as a barrier to corrosive chemicals, preventing them from reaching the protected surface, and providing other properties of a closed cell structure with a low coefficient of expansion. These properties are above and beyond only supplying heat insulation.

An embodiment of this invention allows the use of waste glass streams in manufacturing the closed cell foam glass blocks. This enables the use of glass that would otherwise be discarded into waste landfills, and produces a high quality product from a variable waste stream at a reasonable cost. The cost of waste glass is substantially less than pure glass ingredients presently used. The waste glass is evaluated and adjusted to control the optimum amount of boron to produce a closed cell structure foam to achieve an appropriate coefficient of expansion while achieving an optimum balance of water insolubility and acid resistance. The control of the cellulating temperature and length of time at that temperature also is instrumental in achieving an appropriate thickness of the cell wall to give the resulting structure strength and a closed cell structure.

An object of the invention is to control the boron content in the foamed glass to achieve high water insolubility and acid resistance. A boron content that is too high yields a water soluble foam that would be unsuitable in the flue gas environment. Accordingly, the boron content in the present invention is controlled and maintained within the range of between 7% to 14% by weight. Another object of the invention is to maintain the coefficient of expansion of the foamed glass in a range of between around 33 and 55 ($\times 10^{-7}$). A coefficient of expansion that is too high will cause the foam glass block to expand too much in the flue gas environment and cause structural damage to the flue gas stack. On the other hand, a coefficient of expansion that is too low will leave the foamed glass water soluble, and thereby susceptible to corrosion and damage from wet and dry cycling. The quenching and annealing process is also controlled and managed to achieve the optimum physical properties. It is possible to select borosilicate waste glass streams and make additions to control the coefficient of expansion within the desired range as necessary for a particular application. Other embodiments of the inventive method also may use common soda-lime waste glass streams or mixed boron containing waste glass with soda-lime waste glass and then control the boron content prior to foaming.

The invention teaches a method of manufacture that allows the user to manipulate the foaming agent, oxygen contributor, fluxes and stabilizers to accommodate different glass waste streams. In particular, the amount of boron is carefully controlled along with other additives to produce a closed cell foam having an appropriate coefficient of expansion, a low density, with good water and chemical resistance. These agents are also manipulated to accommodate different heating conditions presented by different furnaces. Furthermore, these agents may be manipulated as necessary depending upon the foaming methods used. There are many variables present in waste glass streams and the invention allows the operator to adapt the process variables to compensate for the waste glass stream variation.

These and other important features of the present invention are more fully described in the section titled DETAILED DESCRIPTION OF THE INVENTION, below.

DESCRIPTION OF THE DRAWINGS

Further features of the present invention will become apparent to those skilled in the art to which the present invention relates from reading the following description with reference to the accompanying drawings, in which:

FIG. 3 a graph depicting the effect of the percentage of $B_2O_3$ in the waste glass mixture to the resultant coefficient of expansion.

DESCRIPTION OF THE INVENTION

Figure 1:
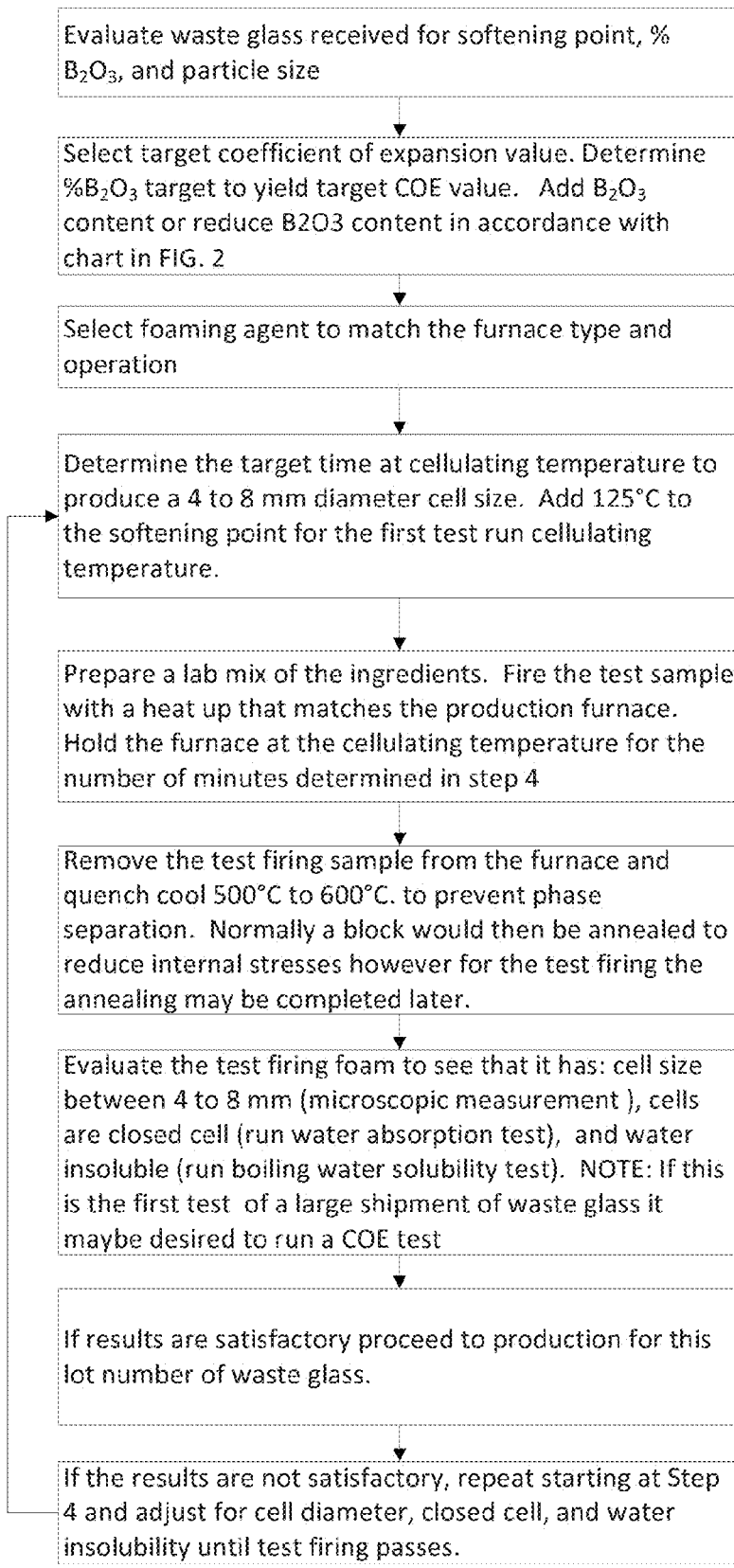
FIG. 1 is a flow chart showing the steps of an embodiment of the inventive process.

It is well known that waste glass streams vary from lot to lot. With consumer waste streams a railcar is loaded with bottles and containers of every color and type of glass composition. Therefore a random charge of waste glass containers is added to a ball mill and reduced to a fine powder. This material is then packed in super sacks and each sack (2000 to 2500 lbs) becomes a lot number and must be treated differently. Commercial manufacturing waste streams that are preconsumer orientated is somewhat more controlled. However the color and composition can vary considerably. Again each super sack is designated as a lot number and treated differently in the process. Sometimes blends are made of different lots of waste glass to produce the desired qualities in the foamed product. The waste glass stream is ground to a uniform particle size which allows the blending with other constituents without separating during later processing. The components of the waste glass are literally frozen in the glass particle and this prevents intimate contact of the added agents to the individual components. For example prior art teaches the pre-treatment of micron sized silica particles with a water solution of boric acid to make a water slurry. This slurry is then spray dried and ball milled to produce dry particles of silica intimately coated with boric acid or other agents foamed and then reground for a second foaming operation.

This invention bypasses all of this pre-foaming work by using waste glass in the 40 to 75 microns average size. The size used in this invention is about 150 to 200 times larger than the glass ingredients used in the prior art. This size is readily available from waste glass collectors on a commercial basis. Prior art also teaches a two step foaming process calling for the glass mixture to be foamed partially and then re-ground and mixed with a new mixture of glass components and foamed again to produce the finished product. This multi-step process is eliminated in this invention thereby reducing energy consumption and increasing through put per labor hour by the simple fact that a one step blending and foaming process is used.

An embodiment of the invention uses high quality borosilicate waste glass ground to between 80 mesh to −325 mesh average particle size. These sizes are normally available from waste glass recycling facilities. The chemical composition of the waste glass that can be used falls within the following ranges: $SiO_2$ 65.0% to 85%, $Na_2O+K_2O$ 2.0 to 12.0%, $B_2O_3$ 6.0% to 14%, $Al_2O_3$ 1% to 6%, CaO+MgO 0.1% to 2.0%, $Fe_2O_3$ 0.05% to 2.0%, BaO<2.5%, $TnO_2$<5.5%, $MnO_2$<1.0%. Depending on the analysis of the waste glass batch, additions are made to bring the $B_2O_3$ content into the desired range of from 7.0% to 14% by weight of mixture. The addition is made using boron-containing compounds such as boric acid, calcium borate, or Gerstley Borate as well as several others chemicals to produce a $B_2O_3$ content from 7.0% to 14% of the mixture depending on the desired end product content. Where the waste glass source is controlled with respect to the boron content, less adjustments are necessary to bring the $B_2O_3$ content in the mixture to within the desired level. Once the adjustment to the desired amount of boron is made the glass batch is mixed using standard dry blending equipment (cone blender, V blender, or paddle blender all equipped with high speed intensifiers) or if the waste glass needs to be narrowed in particle size range the blend is passed through particle size reduction equipment.

Consumer waste glass streams vary in composition in a more broad range than borosilicate waste glass streams. However the method of making a borosilicate foamed block follows the same basic procedure. First the consumer waste glass is ground to between 80 mesh to 325 mesh average particle size. Note that both dark brown and other colors of waste glass will be in the stream and to date these have not been a problems in the foaming process. The darker glass is used only to make the dark colored blocks otherwise there is no substantial change in the process. These particle sizes are normally available directly from waste glass recycling facilities. The chemical composition of the waste glass that can be used falls within the following ranges: $SiO_2$ 65.0% to 85%, $Na_2O+K_2O$ 2.0 to 12.0%, $B_2O_3$ 0% to 15%, $Al_2O_3$ 1% to 6%, $CaO+MgO$ 0.1% to 11.0%, $Fe_2O_3$ 0.05% to 2.0%, $BaO<2.5\%$, $TnO_2<5.5\%$, $MnO_2<1.0\%$. Depending on the analysis of the waste glass batch, additions are made to bring the $B_2O_3$ content into the desired range of from 7.0% to 14% by weight of mixture. The addition is made using a boron-containing compound such as boric acid, calcium borate, or Gerstley borate as well as several others boron containing chemicals to produce a $B_2O_3$ content from 7.0% to 14% of the mixture depending on the desired end product content. Once the adjustment to the desired amount of boron is made the glass batch is mixed using standard dry blending equipment (cone blender, V blender, or paddle blender all equipped with high speed intensifiers).

The waste glass streams for use in the process can come from a variety of sources. Four types of waste glass useful for the process are identified by Wheaton Science Products as Glass Types 180, 200, 300 and 320. (Wheaton Technical Data brochure, Page 9). The desired glass particle size for use in the process should be within the range of about −80 mesh to +350 average particle size (between 177 microns to 40 microns), most preferably around 200 mesh (75 microns). However, particle sizes less than 325 mesh (less than 44 microns) are also suitable. The sources for the waste glass streams generally can provide this size, but if necessary, the glass particles can be ground down to the appropriate size by known methods.

While the chemical composition of the waste glass stream may already include boron oxide, it may be necessary to supplement the glass mix to bring the boron oxide content to within a 7% to 14% by weight range. Boron containing chemicals, such as boric acid, calcium borate or Gerstley borate, may be used. If the content of boron in the waste glass stream is too high a waste glass stream having a low level of boron may be added to lower the resultant boron level. Alternatively, if the content of boron in the waste glass stream is too low a boron containing chemical may be added to increase the boron content. The amount of boron necessary to adjust the level may be determined by using conventional stoichiometry calculations. A preferred content of boron oxide is 9% to 11%. Too much boron in the mixture will result in a water soluble foam that is not conducive to forming closed cells, and ultimately the product would not perform adequately in a wet environment, or an environment exposed to both wet and dry conditions.

The $B_2O_3$ content will determine the resultant coefficient of expansion in the foam glass. The relationship between the $B_2O_3$ content and coefficient of expansion is charted in FIG. 3. In preparing the foam glass, the target coefficient of expansion is selected and the $B_2O_3$ content is adjusted to match that. For the flue gas environment, the target range of the coefficient of expansion is between $55 \times 10^{-7}$ at the upper limit and $33 \times 10^{-7}$ at the lower limit. At coefficient of expansion levels over $55 \times 10^{-7}$ (corresponding to $B_2O_3$ content levels below 7.0%) the foam will expand too much in the flue glass environment and cause structural damage to the flue gas stack. At coefficient of expansion levels below $33 \times 10^{-7}$ (corresponding to $B_2O_3$ content levels above 14%) the foam will become water soluble and not produce closed cells. The following table shows conditions for adding $B_2O_3$, or non-boron containing material (such as silica), to an initial batch mixture in adjusting for the target coefficient of expansion.

| Starting Content of $B_2O_3$ in Batch Mixture | Target COE of $55 \times 10^{-7}$ | Target COE of $33 \times 10^{-7}$ |
|---|---|---|
| 0% $B_2O_3$ | Add to reach 7% $B_2O_3$ | Add to reach 13% $B_2O_3$ |
| 4% $B_2O_3$ | Add to reach 3% $B_2O_3$ | Add to reach 9% $B_2O_3$ |
| 7% $B_2O_3$ | No additions necessary | Add to reach 6% $B_2O_3$ |
| 11% $B_2O_3$ | Add silica to decrease $B_2O_3$ content by 4% | Add to reach 2% $B_2O_3$ |
| 12% $B_2O_3$ | Add silica to decrease $B_2O_3$ content by 5% | No additions necessary |
| 13% $B_2O_3$ | Add silica to decrease $B_2O_3$ content by 6% | Add silica to decrease $B_2O_3$ content by 1% |

A blend of foaming agents, oxygen contributors, and flux stabilizers is added to the waste glass mixture to produce gas bubbles of either carbon dioxide, sulfur dioxide or nitrous oxide for forming cells when the mixture is heated. Foaming agents include antimony trioxide, calcium carbonate, calcium sulfate, silicon carbide, carbon, and sodium nitrate. The type of the foaming agent used is determined mainly by the type and characteristics of the furnace being used and the type of gas desired in the foamed cells. The amount of foaming agent is determined mainly by the softening point of the waste glass charge. It is necessary to time the release of the gas to the appropriate viscosity of the heated glass mixture. If the glass is too viscose when the gas is formed all of the gas will escape and no foam will be achieved. If the glass is too low in viscosity the cell growth will be difficult to control and a structurally sound foam glass will not be formed. Glass viscosity reducers maybe added to reduce the viscosity of the glass at foaming or cellulating temperature. These are mostly carbonates like sodium carbonate and potassium carbonate. The type of furnace used also has an effect on selection of the foaming agent. Slow heat up batch furnaces can allow low temperature foaming gas before the appropriate viscosity of the heated glass is reached. There are some batch furnaces that have a fast enough heat up time (above 10° C. per minute) to allow for use of a fast reacting foaming agent to be used. These however work best in a tunnel furnace which is already hot when the charge enters the first few feet of the tunnel. Another work around in a batch furnace is to use an inert gas to blanket the charge during the heat up period.

Oxygen contributors such as iron oxide, antimony oxide, manganese dioxide, copper oxide, cobalt oxide, nickel oxide are added to provide the proper amount of gas formation. The amount of these additives is controlled by a stoichiometric balance calculation to completely use up the foaming agent or in some cases a slight excess is used to insure that the maximum amount of foaming agent is converted.

The softening point of the glass from the waste glass streams is generally in the range of between 700° C. to 900° C. Because of differences in the chemical characteristics of the constituent materials in the waste glass streams, the softening point temperature for any particular source will vary and changes may exist within any particular lot of material. It is desirable to test a source of waste glass and design the charge formula to meet the glass in that source. It is therefore necessary to determine what the softening point is for the particular waste glass stream source used for any batch of cellular glass produced under the inventive method as that will determine the temperature at which the batch is heated to cellulate the glass as well as the amount of foaming agent required which in turn determines the amount of oxygen contributor to use. The size of the individual glass particles has a great effect on the cell wall thickness developed when foaming. Large particle size creates thick cell walls and small particles size creates thinner walls. The size also determines to a great extent the strength of the cell walls. The best glass size has been found to be between −200 mesh to +350 mesh. The amount of flux stabilizers added is also greatly determined by the particle size of the waste glass stream. Smaller size needs less flux agent (flux agents aid in the fusion of glass particle to glass particle) than a larger particle size. Flux stabilizers that have worked well are antimony oxide, sodium carbonate, tin oxide, and lead oxide. The softening point for any particular source of waste glass may already be provided by the supplier, but if not, it must be determined using standard ASTM test methods. The softening temperature can be lowered by adding boron oxide. However, care should followed to avoid too high a level of boron oxide because it could make the foam water soluble, which can inhibit the formation of closed cells and instead leave interconnecting pores in the glass.

The cellular glass produced under the process is generally intended for forming blocks that will be used in an industrial setting. The mixture of waste glass and foaming agents is placed as a charge in an appropriately-sized mold. The charge will expand during the cellulating process so the mold should have a sufficient depth to accommodate that expansion. The molds should generally be large enough to produce six to eight cut blocks from a single mold although smaller molds are useful in certain types of furnaces.

The cellulating temperature is selected to be around 100° C. to 250° C. over the determined softening point of the waste glass, and more preferably, 125° C. to 175° C. over the determined softening point of the waste glass. This is dependent on the particle size of the waste glass charge and the foaming agent package used. Accordingly, the charge will need to be heated to a temperature generally in the range of about 900° C. to 975° C. The cellulating process is optimized by rapidly heating the mixture batch to the cellulating temperature so that the surface of the charge fuses to effectively trap the carbon dioxide gas formed. If the heat-up time is too long, especially in the gas release temperature range, the gas will pass out of the charge and the cellulating effect will be diminished. The heat-up period will differ depending upon the source of the heat. In a tunnel furnace, the heat-up period could be a few minutes. In a batch process furnace, the heat-up period could be as long as 60 minutes.

The type of commercial furnace that is used is important in achieving a satisfactory closed cell, corrosion resistant, low coefficient of expansion foam. Any type of commercial furnace can be used from electric fired to gas fired as long as the heat input rate and temperature developed is high enough to cause a surface fusion of the powder charge before the foaming agent releases the foaming gas. This fusion of the surface seals in the released foaming gas and allows the cellulating process to proceed. If the heat input and the temperature is too low the foaming gas will be released through the surface of the charge and no cellulation will be retained. The correct heat input and temperature can easily be reached using either a batch process furnace or a continuous feed tunnel furnace. The rate of product powder feed and or the amount of powder charge to a batch furnace will determine the size and heat capacity needed to reach the desired operation. The foaming agent and package can be designed to work with the particular furnace available. This allows the user to custom design the cellulating package to meet the furnace conditions, the changes in the waste glass stream and the desired physical and chemical performance of the finished block.

The temperature required is determined mainly by the softening point of the waste glass stream. Therefore each batch of waste glass is evaluated to determine its softening point. The cellulating temperature is then set at 100° C. to 250° C. above the softening point depending on size of charge and furnace rate of heat input. The amount of time at the cellulating temperature is set by the mass of the charge. The user again has the option of charging a large mass (calling for a longer cellulating time) or a smaller mass (using a shorter cellulating time) and how high to set the cellulating temperature above the softening point.

The charge mix can be varied and is coupled with variation of the cellulating temperature and time to accommodate furnace conditions. The important operational values are (1) rate of temperature increase from the charging temperature to cellulating temperature, (2) reduction or oxidation atmosphere in the furnace, (3) uniformity of temperature throughout the furnace, (4) the temperature control range, and (5) the BTU input per time. The following chart illustrates the difference between a gas fired batch type furnace and a tunnel furnace and how the selection of the foaming agent and other variables are dependent on the furnace type and operation. For the purposes of the illustration only a typical glass blend is shown with 10% $B_2O_3$ in the charge.

CHART 1

| Furnace Type | Batch | Batch | Tunnel | Tunnel |
|---|---|---|---|---|
| Glass Blend | Typical 10% $B_2O_3$ #1 softening point 825° | Typical 10% $B_2O_3$ #1 softening point 825° | Typical 10% $B_2O_3$ #1 softening point 825° | Typical 10% $B_2O_3$ #1 softening point 825° |
| ° C./minute Increase | 15° C. too slow requires reduction atmosphere to prevent burn off of carbon. | 15° C. | 20° C. too slow requires reduction atmosphere to prevent burn off of carbon. | 50° C. fast enough that reduction atmosphere not required |
| Cellulating Temp/time | 925° 40 minutes | 925° 40 minutes | 925° 40 minutes | 925° 40 minutes |
| Atmosphere | Oxidation | Reduction | Reduction | Oxidation |
| Foam Agent | Carbon Burns Off No Foam | Carbon Works well uniform black color | Carbon Works well uniform black color | Carbon Works well uniform black color |
| Foam Agent Alternate 1 | Silicon Carbide Works well Color variable | Silicon Carbide Works well Color variable | Silicon Carbide Works well Color variable | Silicon Carbide Works well Color variable |
| Foam Agent Alternate 2 | CaCarbonate gas release too early no foam | CaCarbonate gas release too early no foam | Ca.Carbonate Works well with lower softening glass mix | Ca.Carbonate Works well with lower softening glass mix |
| Uniformity | Hold at 750° until uniform temp | Hold at 750° until uniform temp | Uniform temp achieve without | Uniform temp achieve without |

CHART 1-continued

| Furnace Type | Batch | Batch | Tunnel | Tunnel |
|---|---|---|---|---|
| | achieved then increase to 925° | achieved then increase to 925° | holding. | holding. |
| Results | Only Silicon Carbide yields Excellent Foam | Reduction atmosphere allows Carbon | Both carbon and SiC yield excellent foam | Both carbon and SiC yield excellent foam |

The heating conditions affect the selection of the foaming agent. For example, the use of calcium carbonate as the foaming agent is dependent on the softening point of the glass charge. The calcium carbonate when heated to 840° C. breaks down to release carbon dioxide gas and is timed to the point where the glass viscosity is low enough to trap the gas and yield a foam. However in the example used in the chart above the glass does not reach the foaming viscosity until about 925° C. At this point the gas has already been released (at 840° C.) and escaped before the glass reached the foaming viscosity at 925° C. The result is no foam. Calcium carbonate will release the gas at the appropriate temperature if a consumer soda lime glass blend is used with the addition of $B_2O_3$ since the softening point of the consumer glass is approximately 759° C. Considering carbon as the foaming agent, it converts when oxidized to carbon dioxide and the release must be timed with the correct viscosity of the glass mix used.

The oxygen contributor is selected to yield its oxygen to the conversion of the carbon to the gas at or near the foaming viscosity of the glass mix. Using antimony oxide as the oxygen contributor the conversion reaction occurs just about at the cellulating temperature of 925° C. and since this gas release occurs when the glass mix reaches the foaming viscosity it is trapped and a foam is obtained. It is important to keep the carbon from burning off before the glass mix reaches the correct viscosity. This can be accomplished by furnace operation. If the time to heat up the charge is too long and the atmosphere inside the furnace has unreacted oxygen (oxidation conditions) the carbon will burn off too early and the gas is released before the glass mix reaches the foaming viscosity. One way to correct this condition is to operate the furnace so that a shortage of oxygen is available for complete combustion of the fuel. Under these conditions the carbon is preserved and still available to release gas at the foaming temperature. An alternate method is to use less time to heat the glass charge to the foaming temperature, doing so quickly so that the carbon is not burnt off and remains for the foaming process. This is more difficult to accomplish in a batch furnace but is fairly simple in a tunnel furnace. In a batch furnace you have a large mass to heat up and this takes time. In a tunnel furnace the furnace mass is already at the foaming temperature and only the glass charge needs to be heated rapidly to the foaming temperature with a much smaller mass.

The above chart shows that a tunnel furnace can produce good results when operated in either an oxidative or a reductive atmosphere. The use of silicon carbide allows for either an oxidative or a reductive atmosphere furnace with a slow heat up time to produce good specification foams because the reaction of SiC with oxygen occurs at a temperature very close to the temperature where the glass mix is at the correct foaming viscosity. The carbon foaming agent always leaves a quantity of carbon that is not reacted and yields a dark black foamed block. The SiC foaming agent yields a foam that is a light gray color. This allows the user to custom design the cellulating package to meet the furnace conditions, the changes in the waste glass stream and the desired physical and chemical performance of the finished block The temperature required for cellulating is determined mainly by the softening point of the waste glass stream. Therefore each batch of waste glass is evaluated to determine its softening point. The cellulating temperature is then set at 100° C. to 175° C. above the softening point depending on size of charge and furnace rate of heat input. The amount of time at the cellulating temperature is set by the mass of the charge. The user again has the option of charging a large mass (calling for a longer cellulating time) or a smaller mass (using a shorter cellulating time) and how high to set the cellulating temperature above the softening point.

Figure 2:
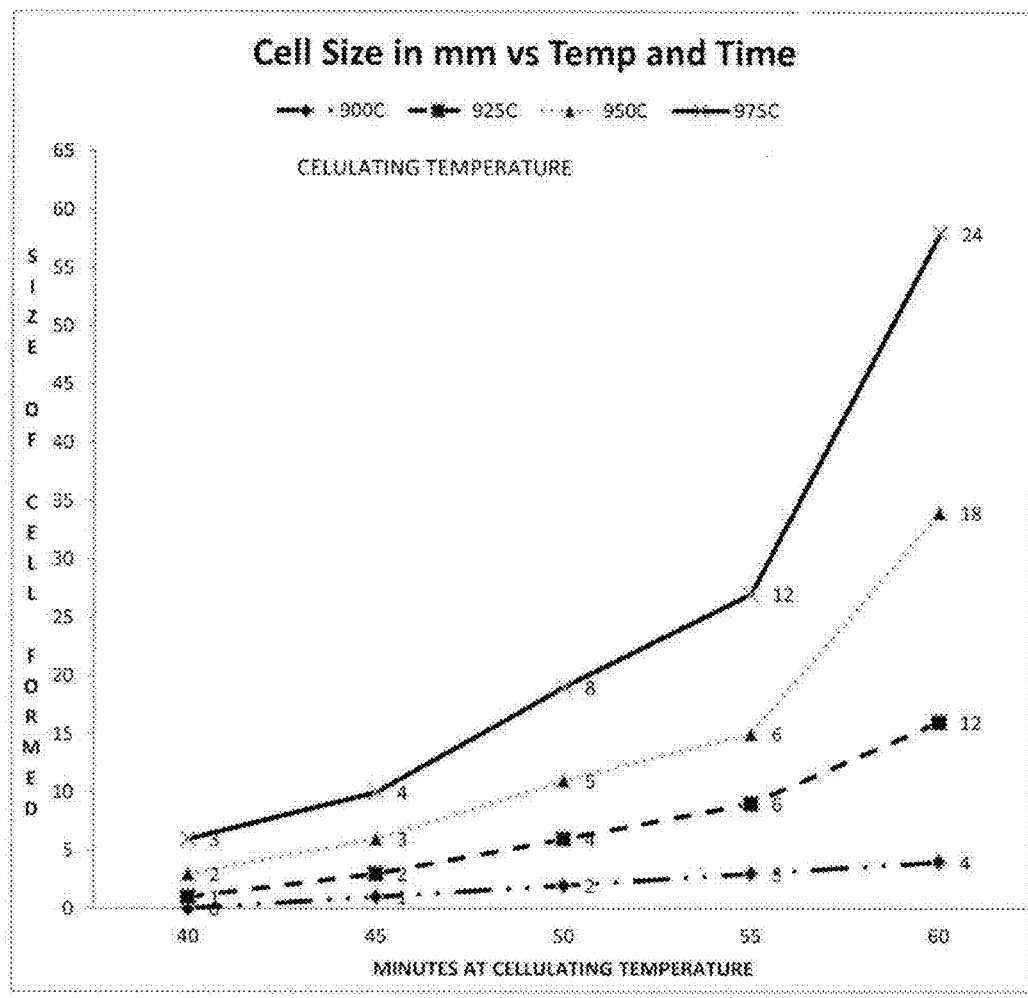
FIG. 2 is a graph depicting the relationship between four cellulating temperature settings and heating time to the cell size for a sample charge of the waste glass mixture.

When the glass charge is at the appropriate foaming viscosity and the gas is released the time that the charge is kept at the foaming temperature is one of the key factors in determining cell wall integrity and strength. FIG. 2 depicts the relationship between the cellulating temperature and the cellulating period in the cell size formed. If the cellulating time is too long the gas in the cells will expand and increase the size of the cell and reduce the thickness of the cell wall to the point where the cell walls crack and produce an open cell structure which allows water and chemicals to enter into the cells and penetrate other cells which will result in failure during service. An example of this is a balloon that when the gas volume inside the balloon increases the cell wall (skin) of the balloon decreases to the point of breakage. Generally there is always excess foaming agent in the glass mix and gas continues to form and cause open cell structures. To prevent this from occurring it is necessary to stop the creation of gas and to cool the glass foam cell walls as quickly as possible, which will increase the strength of the cell walls. This is accomplished by a quench of cool air being conducted onto the glass charge to cool the mass to below the softening point of the glass mix. If the foamed glass is kept above 600° C. for longer than 15 minutes the tendency to phase separate is enhanced. Also, glass mixes that contain $B_2O_3$ can phase separate (normally in the cell walls where the separation occurs) into a boron rich phase and a boron lean phase. The boron rich phase is water soluble. If this phase separation occurs the foam will be water soluble and unfit for the intended application. By quenching the foam to well below the softening point and just above the annealing temperature the phase separation will not generally occur. Therefore maintaining the cellulating time with the end point being controlled by a quench is required to produce a strong closed cell foam with no phase separation (chemically resistant). Batch mixtures having a $B_2O_3$ content above 14% are more likely to phase separate than those below 14%.

The following are examples of different foaming agents used in the process.

Case A-1: Add antimony trioxide ($Sb_2O_3$) from 0.2% to 1.5% by weight of batch mixture. Add Carbon from 0.2% to 1% by weight of batch mixture. Mix with waste glass stream using standard mechanical equipment. The particle size of the mixture will determine the cell size in the foamed glass. Cellulate for time and temperature as determined by the Chart Typical Cellulating Curves in FIG. 2 representing values for a tunnel or fast heat up batch furnace. (Waste Borosilicate Glass 200 (13% $B_2O_3$), antimony trioxide 0.2%, carbon 0.56%, glass melting point 832° C., glass particle size −200 mesh, Heat up 50° C./minute, Cellulating time 45 minutes Temp 975° C.). (Immediately quench to 750° C.). Results excellent closed cell foam and glass structure having a density of 11.5 lbs/ft$^3$ with excellent chemical resistance and a coefficient of expansion within target range (measured at 33×10$^{-7}$ COE).

Case A-2: Add Calcium Carbonate ($CaCO_3$) from 0.2% to 5% by weight of batch mixture. Mix with waste glass stream using standard mechanical equipment. Particle size of the mixture will determine the cell size in the foamed glass. Cellulate for time and temperature as determined by the Chart Typical Cellulating Curves in FIG. 2 representing values for a tunnel or fast heat up batch furnace. (Waste Borosilicate Glass 300 (11% $B_2O_3$, antimony trioxide 0.2%, calcium carbonate 1.56%, glass melting point 800° C., glass particle size −230 mesh, Heat up 50° C./minute, Cellulating time 45 minutes, temperature 945° C.) (immediately quench to 750° C.). Results: gas released before glass mix reached foaming viscosity. No foam, solid glass block.

Case A-3: Add Calcium Sulfate ($CaSO_4$) from 0.2% to 5% by weight of batch mixture. Particle size of the mixture will determine the cell size of the foamed glass. This material is available in large quantities from a waste stream. Mix with waste glass stream using standard mechanical equipment. Cellulate for time and temperature as determined by the Chart Typical Cellulating Curves in FIG. 2 representing values for a tunnel or fast heat up batch furnace. (Waste Borosilicate Glass 320 (7.0% $B_2O_3$), antimony trioxide 0.2%, calcium sulfate 1.0%, glass melting point 832° C., glass particle size −230 mesh, Heat up 50° C./minute, Cellulating time 45 minutes temperature 945° C.) (Immediately quench to 750° C.). Results in excellent closed cell foam and glass structure having a density of 11.0 lbs/ft$^3$. Excellent chemical resistance and coefficient of expansion within target range. (measured 55×10$^{-7}$ COE).

Case A-4: Add Silicon Carbide (SiC) from 0.1% to 5% by weight of batch mixture. Used in conjunction with calcium sulfate 0.4% to provide the sulphate ($SO_3$) and iron oxide to combine with the silicon carbide to give off carbon dioxide which foams the glass. Particle size of the mixture will determine the cell size in the foamed glass. Mix with waste glass stream using standard mechanical equipment. Cellulate for time and temperature as determined by the Chart Typical Cellulating Curves in FIG. 2 representing values for a tunnel or slow heat up batch furnace. (Waste Borosilicate Glass 320 (7.0% $B_2O_3$), silicon carbide 0.95%, calcium sulfate 1.0%, iron oxide 2.0%, glass melting point 832° C., glass particle size −230 mesh, Heat up 8° C./minute, Cellulating time 45 minutes temperature 975° C.) (Immediately quench to 750° C.). Results in excellent closed cell foam and glass structure having a density of 9.9 lbs/ft$^3$. Excellent chemical resistance and coefficient of expansion within target range. (measured 55×10$^{-7}$ COE).

Case A-5: Add Silicon Carbide from 0.1% to 5% by weight of batch mixture. Used in conjunction with iron oxide (0.5% to 5%) to provide the oxygen to combine with the silicon carbide to give off carbon dioxide which foams the glass. Antimony oxide (1%-2.0%) as flux agent. Particle size of the mixture will determine the cell size in the foamed glass. Mix with waste glass stream using standard dry blending equipment. Cellulate for time and temperature as determined by the Chart Typical Cellulating Curves in FIG. 2 representing values for a tunnel or slow heat up batch furnace. (Waste Borosilicate Glass 200 (11.0% $B_2O_3$), antimony trioxide 0.2%, silicon carbide 0.95%, iron oxide 2.0%, glass melting point 832° C., glass particle size −230 mesh, Heat up 10° C./minute, Cellulating time 45 minutes temperature 975° C.) (Immediately quench to 750° C.). Results in excellent closed cell foam and glass structure having a density of 10.1 lbs/ft$^3$. Excellent chemical resistance and coefficient of expansion within target range (measured 34×10$^{-7}$ COE).

Case A-6: Add Silicon Carbide from 0.1% to 5% by weight of batch mixture. Used in conjunction with iron oxide and antimony oxide to provide the oxygen to combine with the silicon carbide to give off carbon dioxide as well which foams the glass. Particle size of the mixture will determine the cell size in the foamed glass. Mix with waste glass stream using standard mechanical equipment. Cellulate for time and temperature as determined by the Chart Typical Cellulating Curves in FIG. 2 representing values for a tunnel or slow heat up batch furnace. (Waste Borosilicate Glass 100 (7.0% $B_2O_3$), antimony trioxide 0.2%, silicon carbide 0.95%, iron oxide 2.0%, glass melting point 832° C., glass particle size −230 mesh, Heat up 10° C./minute, Cellulating time 35 minutes temperature 1050° C.) (Immediately quench to 750° C.). Results in excellent closed cell foam and glass structure having a density of 11.8 lbs/ft$^3$. Excellent chemical resistance and coefficient of expansion within target range (measured 51×10$^{-7}$ COE).

Case A-7: Add Silicon Carbide from 0.1% to 5% by weight of batch mixture. Some waste glass streams have enough free oxygen dissolved in the glass to provide the oxygen to combine with the silicon carbide to give off carbon dioxide which foams the glass. Mix with waste glass stream using standard mechanical equipment. Particle size of the mixture will determine the cell size in the foamed glass. Cellulate for time and temperature as determined by the Chart Typical Cellulating Curves in FIG. 2 representing values for a tunnel or slow heat up batch furnace. (Waste Borosilicate Glass 200 (13.0% $B_2O_3$), antimony trioxide 0.2%, silicon carbide 0.95%, glass melting point 832° C., glass particle size −230 mesh, Heat up 10° C./minute. Cellulating time 45 minutes temperature 1050° C.) (Immediately quench to 750° C.). Results in excellent closed cell foam and glass structure having a density of 12.5 lbs/ft$^3$. Excellent chemical resistance and coefficient of expansion within target range (measured 33×10$^{-7}$ COE).

Case A-8: Add antimony trioxide ($Sb_2O_3$) from 0.2% to 1.5% by weight of batch mixture. Add Carbon from 0.2% to 1% by weight of batch mixture. Mix with waste glass stream using standard mechanical equipment. The particle size of the mixture will determine the cell size in the foamed glass. Cellulate for time and temperature as determined by the Chart Typical Cellulating Curves in FIG. 2 representing values for a tunnel or fast heat up batch furnace. (Waste Borosilicate Glass 200 (13.0% $B_2O_3$), antimony trioxide 0.2%, carbon 0.56%, glass melting point 832° C., glass particle size −200 mesh, Heat up 15° C./minute, Control Furnace Atmosphere in Reduction Configuration, Cellulating time 45 minutes Temp 975° C.) (Immediately quench to 750° C.) Results in excellent closed cell foam and glass structure having a density of 11.5 lbs/ft$^3$ with excellent chemical resistance and a coefficient of expansion within target range. (measured at 35×10$^{-7}$ COE).

Since each lot of waste glass received will vary in chemical make up test firings are made of each lot of waste glass received to adjust the additives, firing temperature and cellulating and annealing periods to produce the desired end product. The flow chart illustrated in FIG. 1 sets forth a procedure for determining optimum $B_2O_3$ content, softening point and particle size for any particular foam glass batch prepared. The properties of closed cell and water insolubility can be measured or determined by statistical testing the blocks produced. A two inch cube of prepared foam glass is immersed in tap water and held under water, bringing the water to constant boiling condition. The block is held at these conditions for four hours. Thereafter the block is removed and weighed and compared to the starting non-tested weight. In considering water insolubility, if the sample has a loss in weight or the physical properties of the block are lost to the point where it crumbles easily the foam has too high of a boron content. In this condition, the boron is easily leached out leaving a weak friable foam structure which would not perform in the flue gas environment. In considering closed cell properties, the degree to which the block increases in weight would give indications of whether the foam achieved a closed-cell structure. If there is a 2% or less by weight gain it would likely be due to water being absorbed on the surface of the block. If there is a weight gain greater than 2%, that would indicate open cells in the interior of the foam.

A further closed cell test would involve placing test blocks in boiling water, thereafter immediately placing them in a dry oven at 350° F. for one hour and then immersed in room temperature water for 30 minutes. This test is repeated for three cycles. The blocks are then tested for strength, expansion and contraction cracks and weight change. If the sample cracks or gains or losses over 2% weight it indicates that the block is not closed cell. Foam with boron content below 7% $B_2O_3$ will start with closed cells but will fail the test because the coefficient of expansion is too low to withstand the cycle test. Foam with a $B_2O_3$ content above 14% will phase separate in the quenching period leaving a phase with a high boron content which is water soluble. After undergoing this test, a high content boron foam block disintegrates. This simple test differentiates stable closed cell foam with a coefficient of expansion in the desired range from unstable foam with either low coefficient of expansion or foam that has phase separated. A simple test for establishing that the foam is resistant to 98% sulfuric acid can comprise immersing a test block in 98% sulfuric acid at room temperature for 24 hours and determining whether the block becomes softened or otherwise damaged.

Foamed glass blocks produced by the inventive process achieve good physical qualities. For example, a foamed glass brick made by this process has a coefficient of thermal expansion in the range of from 33 to $55 \times 10^{-7}$ in the 0 to 300° C. range. The foamed glass brick also exhibits good thermal shock resistance and a 6"×9"×2" block resists cracking or breaking when heated to 300° F. dry heat and quenched in water (65° F.) for three cycles. The foamed glass brick also exhibits good chemical resistance and is resistant to 98% sulfuric acid, boiling water and exhibits resistance to a standard range of chemicals for standard glass.

The closed-cell foam glass produced by the instant invention provides ideal blocks for use in flue gas stacks. In addition to having an environment-appropriate coefficient of expansion, the foam glass achieves a density within a range of 9 to 13 lbs/ft³ that is ideal for its application. Densities higher than the range would add too much weight to the flue gas structure which are generally not built to add on higher densities. The density is related to the cell size and the cell size is related to the thickness of the cell wall. Too low of a density results in thin cell walls and the inability of the foam to remain closed cell in operation. By controlling the $B_2O_3$ content in the 7% to 14% range, low density is achieved while maintaining the high strength of the cell walls. The foam glass block of low density only performs well in service, however, when the $B_2O_3$ content is controlled in range.

Having thus described the preferred embodiment of the invention, what is claimed as new and desired to be protected by Letters Patent includes the following:

1. A method for producing closed cell borosilicate glass comprising steps for:
    a) selecting a batch of glass particle sizes ranging from −80 mesh to +350 mesh;
    b) maintaining a content of $B_2O_3$ in the batch to within a range of 7% to 14% by weight of the batch;
    c) adding a foaming agent to the batch;
    d) determining a softening point for the batch;
    e) heating the batch to a cellulating temperature in the range of around 100° C. to 250° C. above the determined softening point;
    f) allowing the batch to cellulate at the cellulating temperature;
    g) ensuring that cells formed within the batch maintain a closed cell structure with no interconnecting pores between the cells; and
    h) decreasing the heating of the charge to a temperature to permit annealing of the charge;
    whereby the borosilicate cellular glass achieves a coefficient of expansion in the range between $33 \times 10^{-7}$ and $55 \times 10^{-7}$.

2. The method according to claim 1 in which a source of the glass particles comprises waste glass.

3. The method of claim 2 in which the source of glass particles is borosilicate waste glass.

4. The method according to claim 1 in which the content of $B_2O_3$ is maintained within a range of 9% to 11% by weight of batch.

5. The method of claim 1 in which a source of boron is added to the batch to increase the content of $B_2O_3$.

6. The method of claim 5 in which the source of boron is selected from the group consisting of boric acid, calcium borate, Gerstley borate or boron carbide.

7. The method of claim 1 in which the content of $B_2O_3$ in the batch is decreased by adding non-boron containing glass particles.

8. The method of claim 1 in which the content of $B_2O_3$ is controlled to maintain the batch as water insoluble.

9. The method of claim 1 in which the foaming agent is from the group consisting of calcium carbonate, calcium sulfate, carbon, silicon carbide, or sodium nitrate.

10. The method of claim 1 in which the cellulating temperature is around 125-175° C. above the determined softening point.

11. The method of claim 1 in which the batch is exposed to the cellulating temperature for around 35 to 60 minutes.

12. The method of claim 1 in which the density of the borosilicate cellular glass is between 9 to 13 lbs/ft³.

13. The method of claim 1 in which the charge is formed into blocks adapted for construction use.

14. A method for producing blocks of closed cell borosilicate foam glass comprising steps for:
    a) selecting a batch of glass particle sizes ranging from −80 mesh to +350 mesh;
    b) maintaining a content of $B_2O_3$ in the batch to within a range of 7% to 14% by weight of the batch;
    c) adding a foaming agent to the batch;
    d) determining a softening point for the batch;
    e) forming the batch into individual blocks adapted for construction use;
    f) heating the blocks to a cellulating temperature in the range of around 100° C. to 250° C. above the determined softening point;
    g) allowing the blocks to cellulate at the cellulating temperature;

h) ensuring that cells formed within the blocks maintain a closed cell structure with no interconnecting pores between the cells; and i) decreasing the heating of the blocks to a temperature to permit annealing of the charge;

whereby the borosilicate cellular foam glass blocks achieve a coefficient of expansion in the range between $33 \times 10^{-7}$ and $55 \times 10^{-7}$.

15. The method of claim 14 in which the source of glass particles is borosilicate waste glass.

16. The method according to claim 14 in which the content of $B_2O_3$ is maintained within a range of 9% to 11% by weight of batch.

17. The method of claim 14 in which a source of boron is added to the batch to increase the content of $B_2O_3$.

18. The method of claim 14 in which the content of $B_2O_3$ is controlled to maintain the batch as water insoluble.

19. The method of claim 14 in which the cellulating temperature is around 125-175° C. above the determined softening point.

20. The method of claim 14 in which the density of the borosilicate cellular glass is between 9 to 13 lbs/ft$^3$.

\* \* \* \* \*